United States Patent [19]
Juntunen et al.

[11] Patent Number: 5,479,812
[45] Date of Patent: Jan. 2, 1996

[54] ON-SITE CALIBRATION DEVICE AND METHOD FOR NONLINEARITY CORRECTION FOR FLOW SENSOR/TRANSMITTER

[75] Inventors: Robert D. Juntunen; Roger R. Roth, both of Minnetonka, Minn.

[73] Assignee: Honeywell Inc., Minneapolis, Minn.

[21] Appl. No.: 275,868

[22] Filed: Jul. 15, 1994

[51] Int. Cl.⁶ ........................... G01F 25/00
[52] U.S. Cl. ........................................ 73/3
[58] Field of Search ............................ 73/3

[56] References Cited

U.S. PATENT DOCUMENTS

| | | | |
|---|---|---|---|
| 4,253,156 | 2/1981 | Lisle et al. | 73/3 |
| 4,949,578 | 8/1990 | Harpster | 73/202.5 |
| 5,235,525 | 8/1993 | Bybee | 73/3 |
| 5,277,196 | 1/1994 | Honkinson et al. | 73/202.5 |

FOREIGN PATENT DOCUMENTS 2195448  4/1988  United Kingdom ............ 73/3

Primary Examiner—Hezron E. Williams
Assistant Examiner—Daniel S. Larkin
Attorney, Agent, or Firm—Michael B. Atlass; Robert B. Leonard

[57]  ABSTRACT

A method and apparatus for providing calibrated and linearized flow sensors for VAV systems with the sensor corrected for device/electronic/drift/and field air turbulence characteristics using factory calibrated flow or pressure sensors with output modified by a transfer function incorporated into a lookup table for each sensor. This allows low power processors to handle the adjustment onsite. Further adjustment is made onsite with reference to actual flow and turbulence effects.

5 Claims, 5 Drawing Sheets

ON-SITE CALIBRATION DEVICE AND METHOD FOR NONLINEARITY CORRECTION FOR FLOW SENSOR/TRANSMITTER

BACKGROUND OF THE INVENTION

This invention relates to field programmable calibration devices and methods, and has particular application to inexpensive air flow sensor devices needing inexpensive calibration on-site, without having substantial processing power readily or continuously available.

Prior applications assigned to the assignee of this application, Ser. Nos. 08/175,911 and 08/175,908, filed Dec. 30, 1993, describes the field of art and the need for calibration in air flow sensors and one specific device and technique. The preferred flow sensor itself and its packaging/mounting set up is described in Ser. No. 08/173,331.

Because building control systems that use airflow sensors are being connected to distributed intelligence networks, new problems have arisen. The processing power available to the sensor is limited by a local inexpensive processor, and the sensor itself must bellow cost sensor. Accordingly, the invention here allows for accurate flow measurement with low-cost components and low computational power processors.

SUMMARY OF THE INVENTION

This invention allows low cost components to be utilized with individual zone controllers in buildings with Variable Air Volume (VAV) Heating and Air Conditioning systems without sacrificing sensed accuracy.

Pressure independent VAV systems require determination of the quantity of air into the space (cfm which is fpm*duct area) as a control variable and to ensure certain air quality standards, including temperature, are being met. The sensing system is comprised of a mechanical pickup assembly (11), interconnection tubing (1,2) and a sensor (17). The mechanical assembly exhibits a non-linear transfer function (Velocity vs. Pressure) and differs with different duct sizes and manufacturers.

Low cost sensors can be used to generate accurate measurement of air flow yet may exhibit a non-linear transfer function. This invention defines a process that allows low computational power processors to interact with the above mentioned flow conversion system and provide accurate readings without requiring extensive real time calculations.

In the factory a small number of air pressure values are presented to the device with the corresponding converted (i.e., digital representations of) values retained in non-volatile memory. This data (shown graphically 5a) contains non-linearity information from the sensor and any associated amplification and analog to digital conversion. These values are sent to a large processor that uses them and the values for the pickup/duct size curve (shown graphically 5b) and mathematically combines them into a system linearization curve (shown graphically 5c). These values are downloaded into nonvolatile memory and retained over the life of the product (The mathematical combining process may be done on-site if desired).

Additionally the actual transfer function of the pickup assembly may be different than the ideal due to turbulence-induced noise that may exist at the pickup assembly. The turbulence is caused by bends in the supply and/or exhaust duct work and is entirely site dependent. Therefore, a site commissioning process may be performed with actual test conditions to normalize the flow response regarding these effects. The correction for turbulence is typically conducted at minimal and maximum flow condition for the particular duct size. A third calibration point is provided to correct any null drift (at zero flow) associated with the sensor. This normalization set is stored in memory and is handled as an offset to the ideal linearized transfer function.

With this kind of reliable air flow data coming from every flow sensor in the HVAC or VAV system, reliable and enhanced ventilation control can be maintained. A competitive advantage is obtained when this system is utilized by the fact each sensing node can utilize less expensive non-linear sensors and less expensive processors.

DETAILED DESCRIPTION OF THE INVENTION

Figure 1:
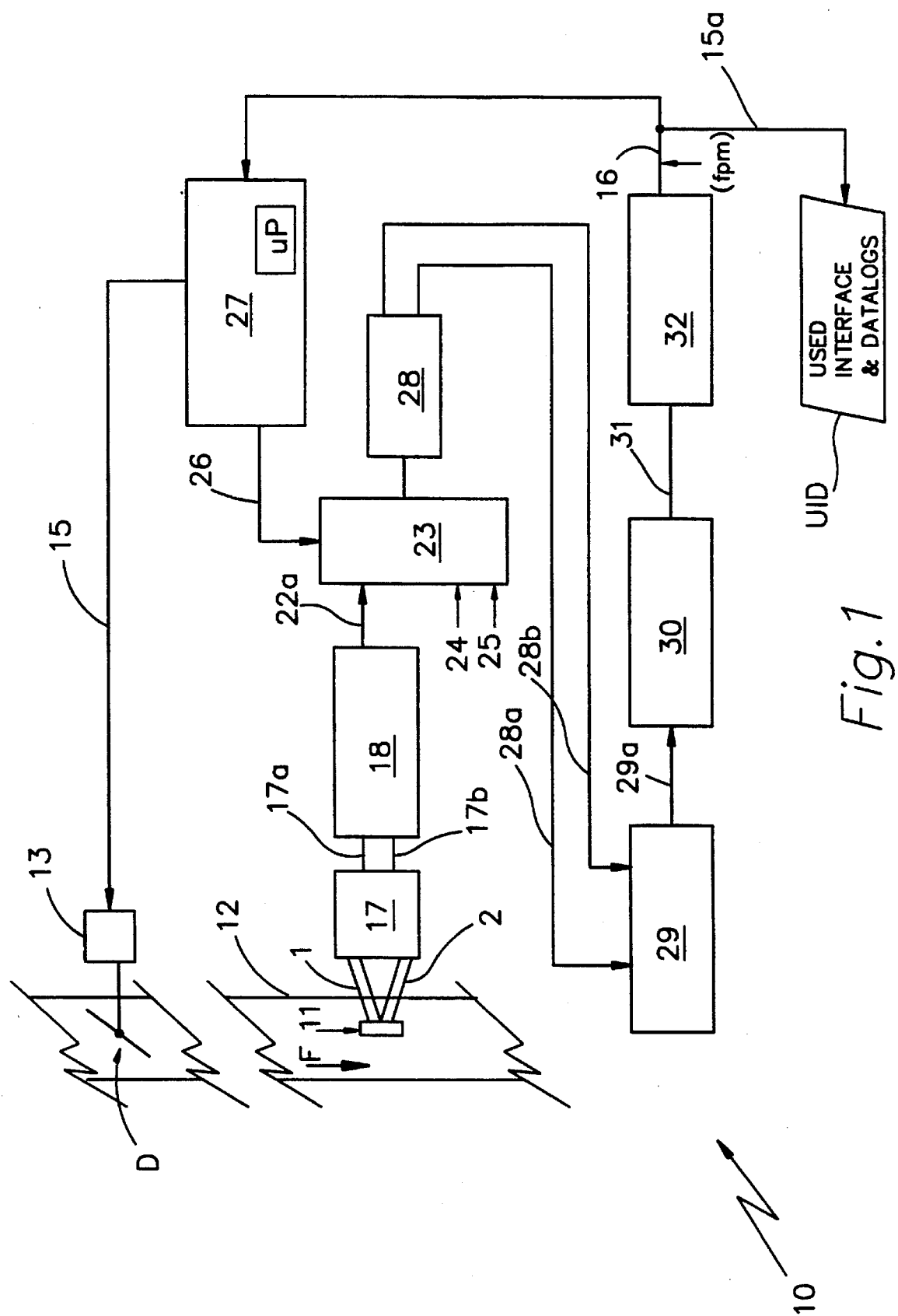
FIG. 1 is a block diagram of the flow of information signals from the air flow duct/sensor to the control devices that operate because of the values read from the calibrated signal.

This invention allows for low cost compensation for pickup device nonlinearity, sensor nonlinearity, and nonlinearity introduced by silicon based electronics.

The sensor pickup device itself 11, situated appropriately in the air duct 12 to measure the flow of passing air F to control the damper D forms the basis of the system 10 by which the measure of air flow may be used as one of the parameters in determining and controlling the amount of air flow and ultimately room temperature. The preferred embodiment was designed with a particular flow sensor in mind but this invention can be used with nearly any flow or pressure sensor of appropriate sensitivity and output.

More particularly how the system works is first described with reference to FIG. 1. Because the pickup device 11 locally restricts the air flow in the duct, there is an air pressure drop across the pickup device. Hoses 1 and 2 transfer the up and down stream air pressures to a low cost pressure/flow sensor 17. The relationship between the air flow and the pressure differential is non linear. Typically the pressure is a nearly a square root function of the air flow velocity rather than a linear relationship. The manufacturer of the pickup device commonly furnishes curves relating air flow and pressure drop, so no experimentation is needed. If one were to design his own pickup device such a relationship curve as shown in FIG. 5 could easily be developed by those skilled in the art.

The controller motor and actuator assemblage 13 is operated in response to a signal which is derived from control algorithm containing control system 27 and sent by system 27 across line 15 in order to actuate the damper D. The control may be through a distributed network of controllers like 27 or, alternatively, it could feed into a general purpose computer programmed to deliver an appropriate signal to actuators like actuator assemblage 13, or dedicated hardware or some combination as would be well understood by the ordinary practitioner of this art. For example, it could be a duly organized collection of electronic components responsive to upstream signals generated in accord with the remainder of the description of this device that generates a control signal responsive thereto.

The controller 27 employs knowledge of the user desired setpoint (flow and temperature) together with the output 16 indicating the amount of air flow (preferably in feet per minute) to produce a control signal to send on line 15 (which may be any appropriate communication pathway) to actuator 13 so as to control the positioning of damper D. The controller may also be connected to a user interface and data logging device UID via communications path 15a, to keep the user informed of system operations.

In any event, system 10 uses the resulting velocity (preferably expressed as a feet per minute or fpm) signal value on line 16 to generate signals to actuate the damper (via line 15) and/or to report data out (via line 15a) to User Interface and Data logs).

The pickup device 11 has two attached pressure hoses 1 and 2 which are connected to provide a flow of air across the flow sensor 17. The positioning of the hoses facing into and out of the air stream flow F to get a good representation of the flow is well known in the art. The flow sensor itself in the preferred embodiment is a micromachined silicon-based bridge structure which generally supports a wheatstone bridge configuration of resistors exposed to the flow of air in a predetermined pattern in an arrangement which has come to be well known in the art. The sensor converts the pressure differential into a differential voltage. The relationship of the pressure differential to the sensor output voltage while nearly a straight line is also somewhat non-linear. (Also, the flow sensor parameters vary greatly from unit to unit because of manufacturing tolerances, especially using the preferred for economy microbridge type sensor.)

A number of different flow sensor bridges with input and output hoses or connectors to hoses are presently commercially available from the Micro Switch Division of Honeywell Inc. For the preferred embodiment of this invention the output of each side of the bridge is provided to the inverting and noninverting inputs of an general amplification block op amp 18. This block in the preferred embodiment is assumed to incorporate some means for null and Full Scale Output adjustment such as is described by patent application Ser. No. 08/175,911 filed Dec. 30, 1993; however, those of ordinary skill in the art can use potentiometer adjustments or laser trimming, or other adjustment schemes to adjust gain and offset as desired.

Referring back to FIG. 1, the function of amplifier block 18 is described. The implementation of this amplifier block may preferably be accomplished using an application specific integrated circuit (ASIC) in which the silicon device required to implement the amplifier can cause some nonlinearity. A multiplexor switch 23 selects one analog voltage value at a time to be converted to a digital count value. The control logic 27 causes the multiplexor switch to connect the analog to digital converter, 28, to one of the analog inputs 22a, 24 or 25. Since the analog to digital converter 28 may also be preferably implemented as part of an application specific integrated circuit, some of its characteristics may also be slightly non-linear. The digital count values outputs from the digital to analog converter may be stored in memory related to or part of a microprocessor [not shown separately, but included in box 27]. Analog to digital conversion of the flow sensor amplifier output and calibration voltage are repeated periodically since the air flow may change due to changes in damper position, changes in the air supply source pressure, and so forth.

The output from the amplifier block 18 is input into a multiplexor 23 on line 22a. Multiplexor 23 has other control inputs 24 and reference voltage 25. The mux channel select input for line 26 is produced by the control logic 27. Line 26 may, of course, be multiple lines depending on the multiplexor configuration.

The output of the multiplexor 23 goes to a A/D converter device 28. This device produces both reference voltage counts and flow sensor voltage counts across lines 28a and 28b, respectively. The flow sensor counts are corrected via reference voltage correction device 29, producing an output on 29a of a voltage level. This level is linearized (as described in detail later) using the linearization table 30 producing a feet per minute representative signal 31 which must still be corrected (as described in detail later) by the three (in the preferred embodiment) field correction calibration points 32.

Finally, the air velocity signal (FPM) is output on line 16 to the controller 27.

THE PROCESS FOR PREPARING THE SYSTEM FOR USE

Figure 2:
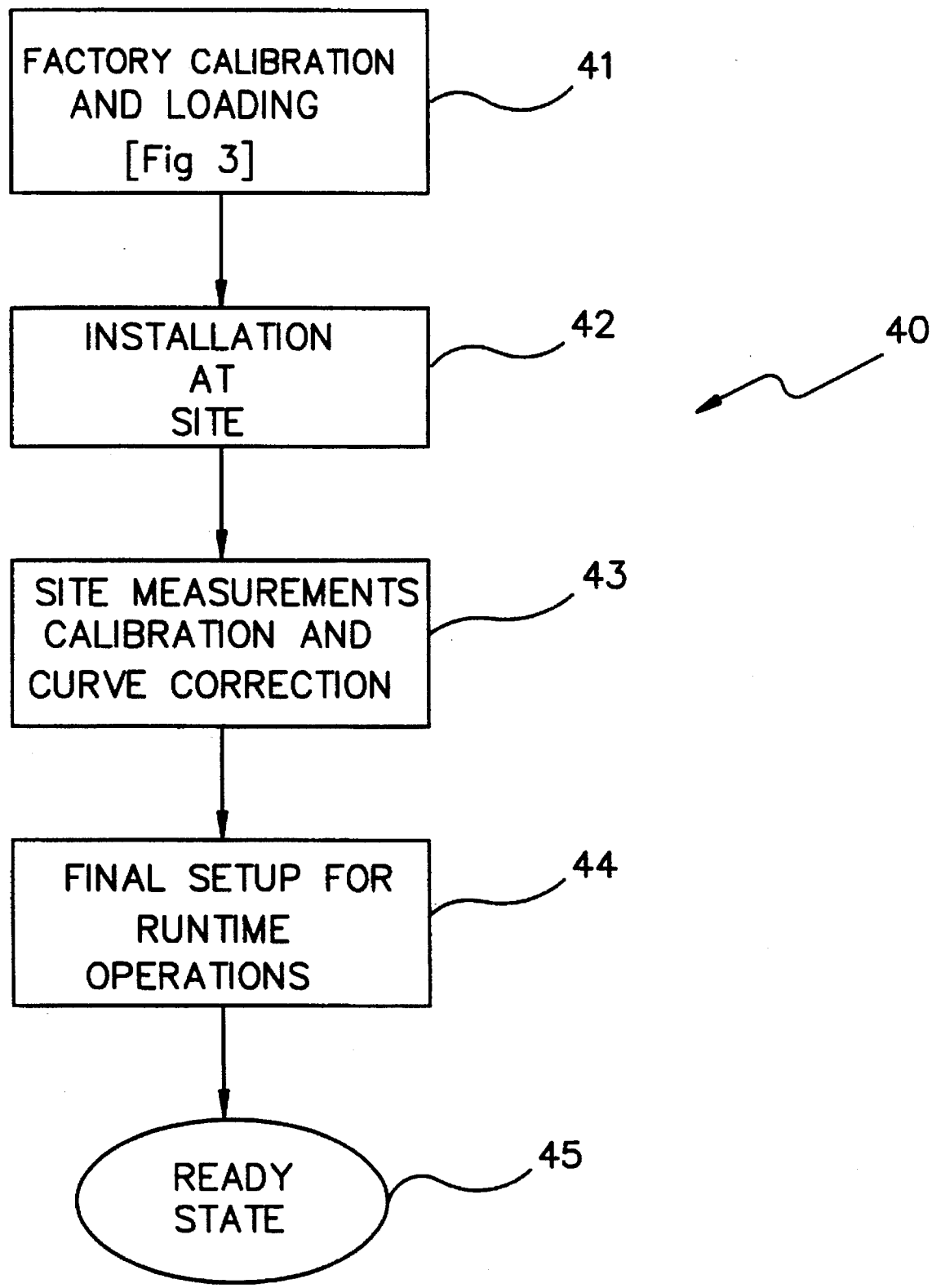
FIG. 2 is a flow diagram of the steps employed in the preferred embodiment of this invention.

Refer first to FIG. 2 in which the abbreviated flow diagram 40 is shown, consisting of the steps of factory calibration 41, installation at the site 42, measurement at the site and storage of curve correction data 43, and final setup for runtime 44 to achieve the ready state 45. The steps 41 and/or 42 include a curve generating and storage of lookup table procedure that employs a substantial processor which is external to the installed device. In the preferred embodiment it is done in a program called CARE™ (Honeywell Inc.) that is a software tool run on a general purpose computer which calculates the linearization table based on the input the user gives it. This is explained in more detail later, but it is important to note here that this curve and table generation can occur either at the factory or in the field (at the installation site).

Figure 3:
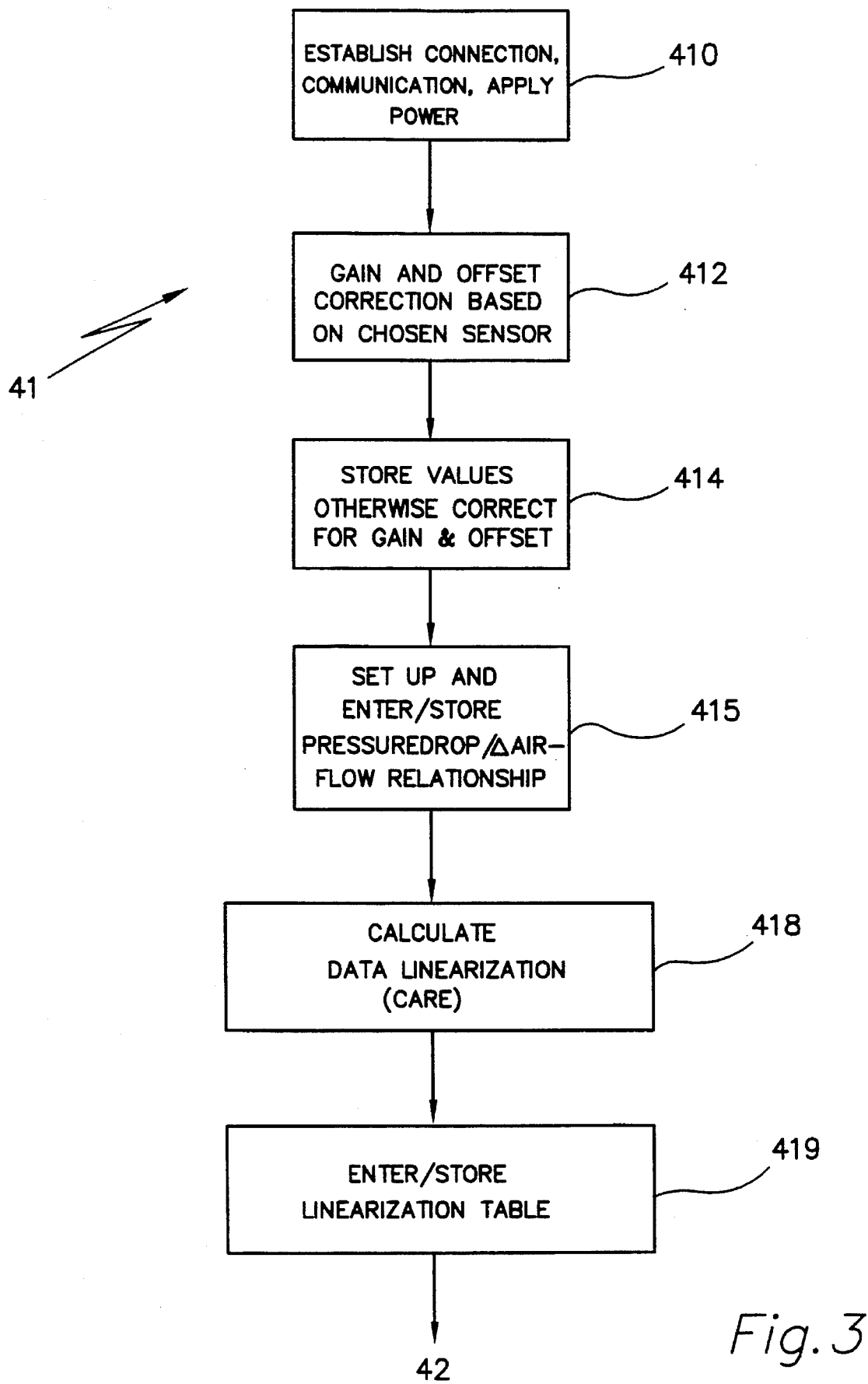
FIG. 3 is a detailed flow diagram of a portion of FIG. 2.

FIG. 3 describes the calibration and linearization processes which, as was described in the last paragraph, are between steps 41 and 42. The sensor and related electronics are first connected to power and communications in step 410. In step 412 if calibration of gain and offset was not already done, it is done by whatever method is suitable to the source and application. Then, the preferred embodiment substeps to 414 calibrate the analog inputs 17a and 17b, and save the necessary parameters in network variable nv__cal (saved in EEPROM) are given as follows: Apply power to the unit under test and connect an in-factory tester to the communications port (in the preferred embodiment a LonWorks port, available and trademark from Echelon). Establish communications with the diagnostics network variables in the unit under test on the LonWorks network. This requires a query__id for the neuron__id and knowing (by reading, preconfiguring or writing) the network image saved in EEPROM.

Now the unit is ready for determination of calibration data by means of actually inputting pressures to the flow sensor across tubes 1 and 2 (FIG. 1). Then the voltage at 29a (FIG. 1) is read via the network for each pressure applied to the sensor. Then the values that were read should be stored in EEPROM or other semi-permanent memory via network variable nv__cal. In other words the flow sensor nonlinearity is to be measured and stored. For this the preferred embodiment uses three pressures, none, one inch of water and two inches of water, thus:
Send nv_cal to the unit under test with:
si_flow_sen_volts_s12[0]=voltage measured at zero inches of water
si_flow_sen_volts_s12[1]=voltage measured at one inch of water
si_flow_sen_volts_s12[2]=voltage measure at two inches of water
si_flow_sen_in_s12[0]=(one inch of water)
si_flow_sen_in_s12[1]=(two inches of water)

Figure 5A:
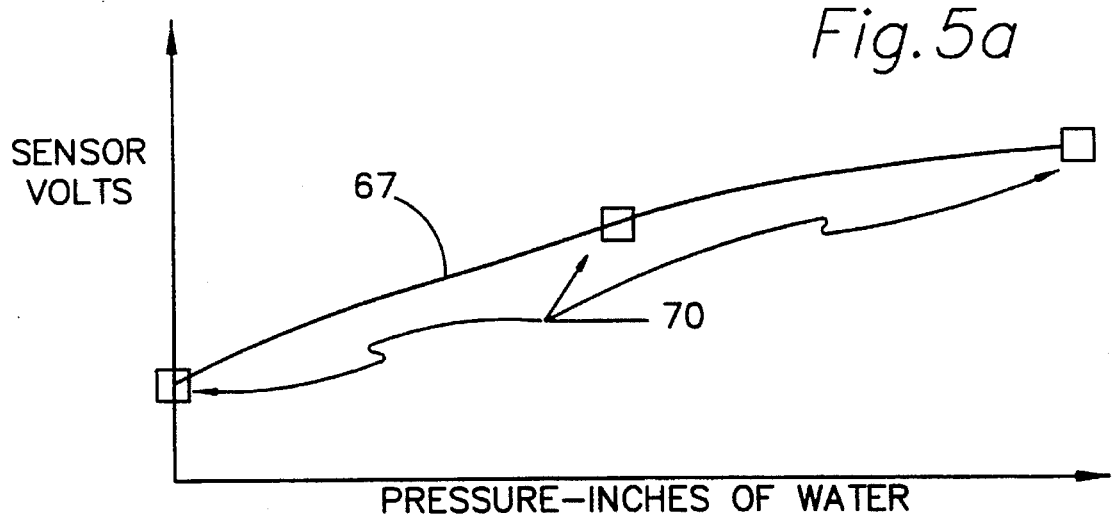
FIGS. 5a, 5b and 5c are curve plots.

THESE ARE THE POINTS 70 on FIG. 5a. They are saved in EEPROM at locations names nv_cal. (Zero inches of water is not included because it's understood to be zero always.)

Thus steps 415 is accomplished and the unit is ready for total "system linearization".

First the relationship between pressure drop and air flow must be established. As stated before it is common for the manufacturer of an air flow device to provide this data, or it can be established through testing if needed. This is commonly called a pickup relationship.

The recommended steps to linearize the flow sensor and save the necessary parameters in network variable nv_flow1_volts and nv_flow1_fpm (stored in EEPROM) are given as follows: (The appendix has a detailed GWBASIC program that calculates the linearization curve from the values stored in nv_cal and the calculated pickup curve.) The readers may of course vary the design to suit their system.

1. First a connection has to be made to the unit under test, then apply power to the unit under test and connect the field unit or the factory tester either of which has the linearization program to the unit's communications port. Establish communications with the diagnostics network variables in the unit under test on the LonWorks network. This requires a query_id or a service message for the neuron_id and knowing (by reading, pre-configuring or writing) the network image saved in EEPROM.

2. Calculate or manually enter the pickup relationship between the pressure drop across the flow sensor (inches of water) versus air flow velocity (feet per minute). Some pickup manufacturers supply equations relating pickup pressure drop to air flow(2a). Others may provide a curve based on measured values(2b).

2a. Calculate the pickup relationship. For example, some manufactures specify a square root relationship between flow and pressure drop: CFM= K* SQR(P)
where:
CFM is the flow in cubic feet per minute
K has various values for different duct sizes
P is the pressure drop in inches of water
This can be converted to VEL=K*SQR(P)/AREA, which is a mathematical representation of curve in FIG. 5b.
where:
VEL is the flow in cubic feet per minute
K has various values for different duct sizes
AREA is the duct area in square feet
P is the pressure drop in inches of water
By using a standard set of pressure drops an array of ten points, VEL(n), can be calculated. It is recommended that for most variable air volume systems the points be calculated at P(n)= 0, 0.0125, 0.025, 0.05, 0.10, 0.20, 0.40, 0.80, 1.60 and 2.00 inches of water. By spacing the pressure values close together for the small values and spacing them wider for the large values, the linearization process will be more accurate since the pickup curve characteristics has a greater slope for the small values.

2b. Manually enter the pickup relationship. For cases where the pickup curve can be measured, the ten points should be entered manually for each pick-up type and duct size or configuration. The points VEL(n), P(n) describe the pickup curve characteristics.

Figure 5B:
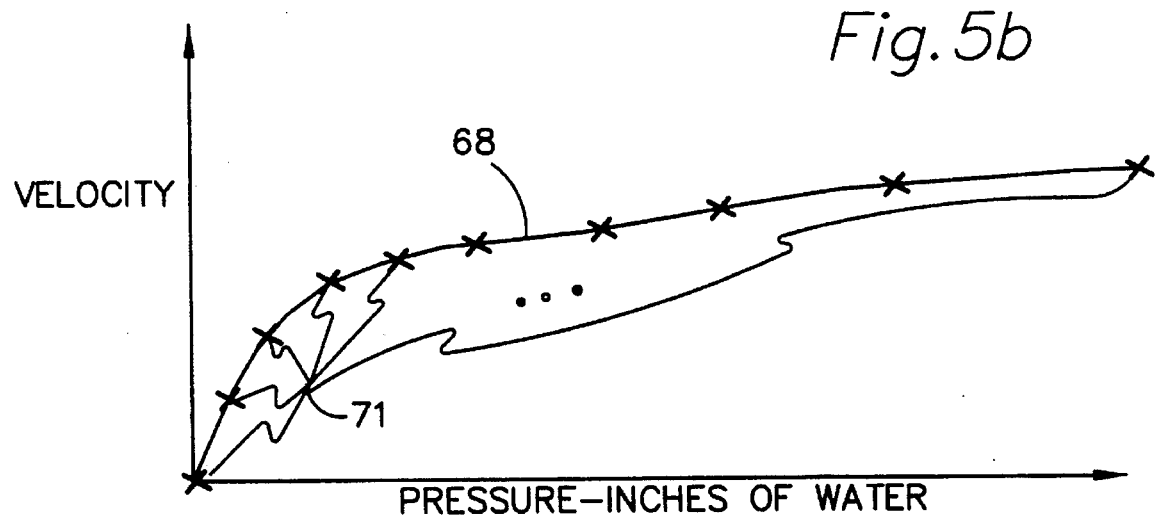

Either step 2 (a or b) results in the curve FIG. 5b.

3. Calculate linearization curve from nv_cal and pickup curve using the following formulas:

First, calculate the coefficients for the La Grange interpolation polynomial for the sensor curve using (La Grange interpolation is a well known method):

R0=Y0/((X0–X1)*(X0–X2))
R1=Y1/((X1–X0)*(X1–X2))
R2=Y2/((X2–X0)*(X2–X1))
C0=R0*X1*X2+R1*X0*X2+R2*X0*X1
C1=–R0*(X1+X2)–R1*(X0+X2)–R2*(X0+X1)
C2=R0+R1+R2
where:
x0=0
X1=nv_cal.si_flow_sen_in_s12[0])
X2=nv_cal.si_flow_sen_in_s12[1])
Y0=nv_cal.si_flow_sen_volts_s12[0])
Y1=nv_cal.si_flow_sen_volts_s12[1])
Y2=nv_cal.si_flow_sen_volts_s12[2])
R0, R1, and R2 are intermediate coefficients
C0, C1, and C2 are second order polynomial coefficients Second, calculate the points on the linearization curve using:
VOLTS(n)=C0+C1*P(n)+C2*P(n)^2,
which is a mathematical representation of FIG. 5a.
where:
P(n) are the points on the pressure curve from step 2 above.
VOLTS(n) are the points along the linearization curve on the voltage axis.
Note: The points along the linearization curve on the velocity axis are contained in VEL(n).

4. Download the revised $nv_{13}$ flow1_volts and nv_flow1_fpm to the node under test using explicitly addressed network variables. Where:
nv_flow1_volts.si_12[n]=VOLTS(n)
and
nv_flow1_fpm.si_s3[n]=VEL(n)
Note that nv_flow1_volts and nv_flow1_fpm are the names of the locations in EEPROM that store the curve, and are points 72 on the curve in FIG. 5C.

In all cases a scaling factor should be used to shift the binary point. We use only 16 bit numbers to represent voltages or fpm and need to scale them by shifting the binary point to the left 12 for voltage and 3 for fpm. Use of 16 bit numbers and not using floating point numbers is the preferred method of using low processing power processors, but the reader may select others if desired.

Figure 5C:
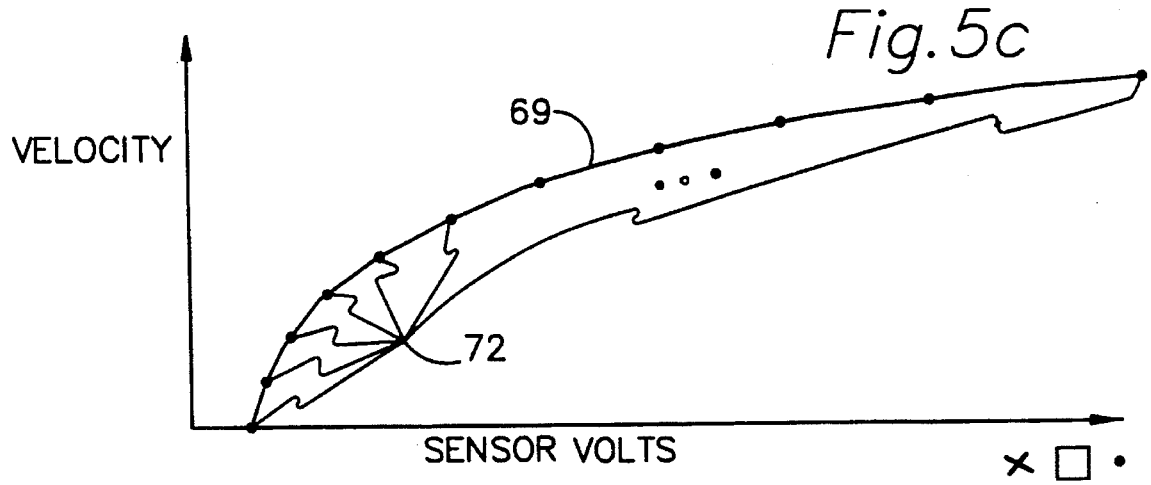

Reference should now be made to FIGS. 5a, 5b, and 5c, illustrates how the sensor curve (reconstructed from the three points saved during factory test), is combined with the pickup curve into a linearization curve. In FIG. 5a the three measured points at zero, one and two inches of water pressure are illustrated as boxes 70 on curve 67. In this curve and in curve 68 of FIG. 5b the points (70,71) that make up the curve are the extrapolated relationship between velocity and pressure, i.e. relating volts of sensor output to inches of water. The y axis in FIG. 5a is sensor volts and in FIG. 5b is velocity (preferably fpm). In accord with the steps outlined above, the curve 69 of FIG. 5c is generated through points 72. The curve plots velocity vs. sensor volts.

FIELD CALIBRATION

Figure 4:
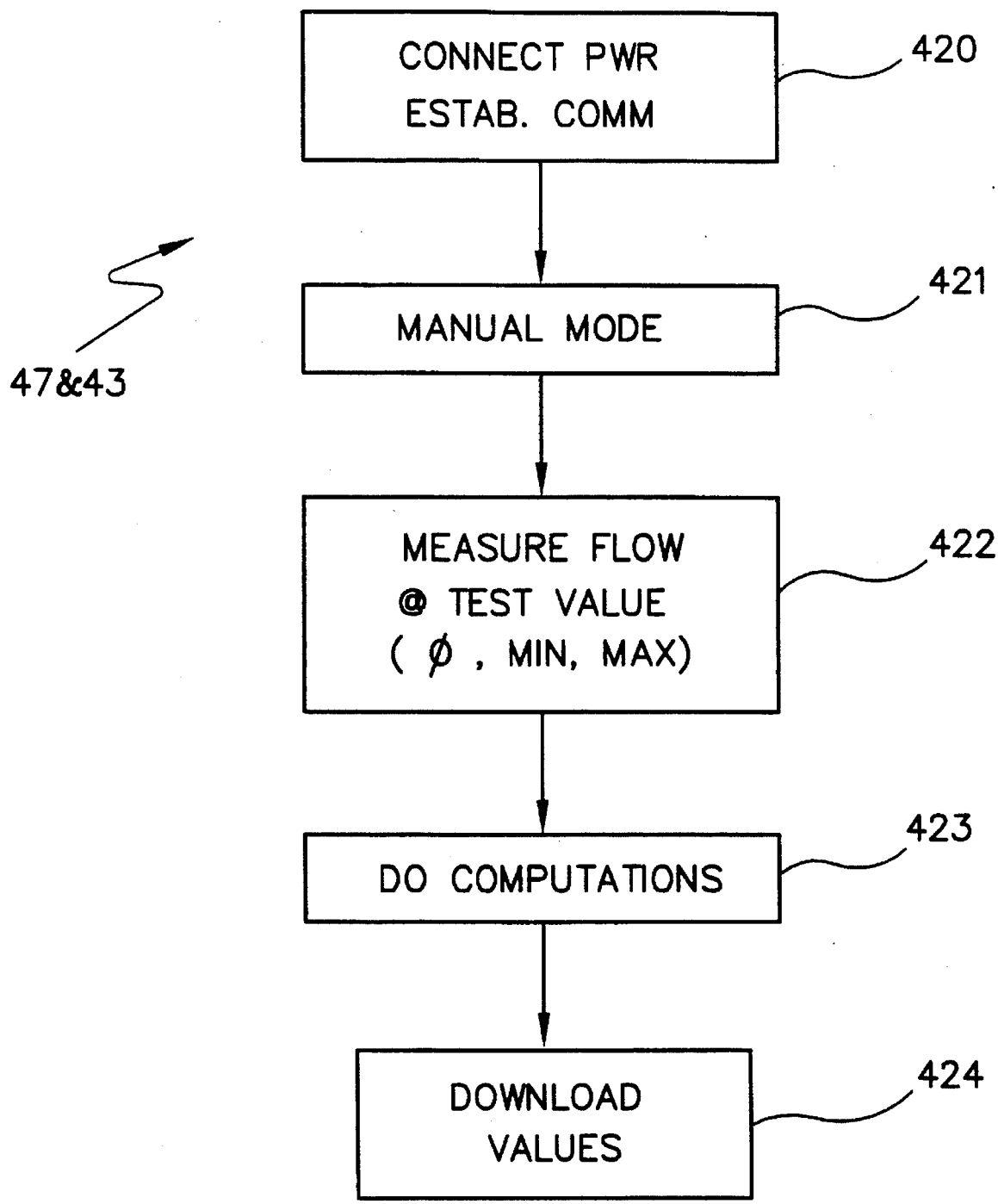
FIG. 4 is a detailed flow diagram of another portion of FIG. 2.

Referring to FIG. 4., the steps 42 and 43 from FIG. 2 are explained in greater detail. Again the device must be connected in place, powered up and communications established 420. Here the unit is placed into a "Manual Mode" 421, then the flow through the positioned device is measured with the relevant damper or other air flow control device set at no flow, minimal flow and maximal flow 422. The values are then downloaded 424 to account for flow drift and flow sensor error due to duct geometry. The recommended procedure is given in detail as follows:

1. Connection. Apply power to the unit under test and connect CARE to the LonWorks port. Establish communications with the diagnostics network variables in the unit under test on the LonWorks network. This requires a query_id or a service message for the neuron_id and knowing (by reading) the network image saved in EEPROM.

2. Cause the node to go into manual mode by sending appropriate network variable values for each case given below. Measure the flow at three points with appropriate instrumentation.

3. Zero flow. First close the damper. After the damper has fully closed, set measured apparent zero to nv_sensor.si_flow1_fmpa_s3 (to be down loaded later to nv_flow1_cal).

4. Minimum flow. Set the damper to a position to minimum flow by "manually" adjusting the damper position (by sending the network variable with appropriate values) until the measured minimum flow is achieved. Then:

actual_main_flow=measured flow (in cfm)/(nv_config.si_duct_area_s12)
   apparent_min_flow=nv_sensor.si_ flow1_fpma_s3

Note: nv_sensor and nv_config can be polled to get the values while the actual flow is being measured Use the values actual_min_flow and apparent_min_flow later when downloading nv_flow1_cal.

5. Maximum flow. Set the damper to a position to maximum flow by "manually" adjusting the damper position (by sending the network variable appropriate values) until the measured maximum flow is achieved. Then:

actual_max_flow=measured flow/nv_config.si_duct_area_s12)
   apparent_max_flow=nv_ sensor.si_flow1_fpma_s3

Note: nv_sensor and nv_config can be polled to get the values while the actual flow is being measured Use the values actual_max_flow and apparent_max_flow later when downloading nv_flow1_cal.

6. Download nv_flow1_cal to the node with the following values:

nv_flow1_cal. si_apparent_zero_s3=measured_apparent_zero (scaled)
nv_flow1_cal.si_apparent_min_s3=apparent_min_flow (scaled)
nv_flow1_cal.si_actual_min_s3=actual_min_flow (scaled)
nv_flow1_cal.si_apparent_max_s3=apparent_max_flow (scaled)
nv_flow1_cal.si_actual_max_s3=actual_max_flow (scaled)

Note that nv_flow1_cal is the name of the locations in EEPROM where the correction values are stored in the preferred embodiment.

GENERAL COMMENTS

The preferred embodiment next performs three processing steps. A Neuron (a registered trademark of Echelon Corp.) microprocessor is currently employed by the preferred embodiment because it is well adapted to building control systems busses. Certainly other microprocessors may be employed where they are designed into the building, but the programming will have to be appropriately modified. As can be seen, the programming steps are not difficult and undue experimentation will not be required to apply the programs of this disclosure. These steps are repeated periodically (typically once a second) as indicated below:

1. The reference voltage digital counts and the flow sensor digital counts are combined mathematically to correct for some analog to digital converter parameter variations that occur with time or environmental temperature. The output is a signal representing the "voltage number" which represents the amplifier output voltage.

2. This voltage number signal is passed through a linearization process based on a linearization table. The table is constructed for each individual sensor device [units 17, 18,and 28, of FIG. 1) based on measurements made during the factory calibration procedure and based on the pickup device curve. The output of the linearization process is the air flow (in feet per minute) before field correction.

3. Next, the calculated air flow is further corrected for the effects of turbulence after the unit is installed at the site by the field correction using a field correction table. This corrected value is used by the control algorithm for control of the air flow via a damper, for data logging, and for display by a user interface.

The processor is programmed in Neuron-C (the language for the Echelon Corp. Neuron chip). In the Appendix is source code detailing preferred embodiment processing steps. In addition the EEPROM storage of the calibration table (nv_cal), linearization table (nv_flow1_volts and nv_flow1_fpm), and field correction table (nv_flow1_cal) are included.

The processes are either standard processes that have been used in variable air volume (VAV) controllers in the past such as in the Honeywell R7453 series of VAV controllers. But, these techniques do not teach how to implement, nor suggest a method of calculating a linearization table to compensation for nonlinearities, and no combination of any prior art appears to show this comprehensive compensation scheme.

In addition the reference voltage from the on-chip reference is measured and stored as "nv_cal" in the factory testing procedure. This is done so voltage measurements are more accurately corrected. The raw (but converted to digital information) analog signal value data is filtered in the preferred embodiment by a software process that simulates an RC filter but operating on digital values. The flow sensor output (volts) are converted to real-world engineering units using one calibration value read by the A/D(analog to digital) converter (reference voltage) with its corresponding values stored in memory. This corrects for A/D circuit variations and drift.

The flow sensor voltage is linearized and converted to feet per minute (or other desirable measure of flow speed) by applying a linearization curve stored in memory (nv_flow1_volts and nv_flow1_fpm). Between stored curve points, linear interpolation is used. The linearization curve is loaded into memory using a CARE tool. The curve is calculated by the CARE tool and takes into account the sensor variations (nv_cal) and the pickup device curve (which is unique for each model and duct size). The pickup device curve may be entered into the CARE tool manually or may be recalled from a library of pickup curves.

The invention is not taken to be limited except as set forth in the following claims.

APPENDIX 1 naming conventions

Since Neuron C has several unique restrictions the following naming convention has been adopted for the interface specification. Neuron C uses one byte quantities as short, character, int or enum types. Two byte quantities are long int types. The following data types have prefixes appended before the name. When the quantity is a numerical value, the suffix is appended after the name. The prefix or suffix is separated from the name with an underbar "_" character, i.e. prefix_name_suffix.

| Type | prefix before name | suffix after name | comment |
|---|---|---|---|
| structure | none | none | |
| enum | none | none | |
| pointer | p | none | no other prefix required |
| union | n | none | no other prefix required |
| network variable | nv | | no other prefix required |
| i/o declarations | io | | no other prefix required |
| unsigned | u | | appended before b or i |
| signed | s | | appended before b or i |
| byte or short or short int | b | | appended after u or s |
| long or long int | i | | appended after u or s |
| scaling | | s0 ... s16 | for fixed point variables see binary point definition | i.e. si_flow_input_filter_value_s6 identifies the variable as a signed integer with a scaling of six bits behind the binary point.

Appendix B - Example program showing how to calculate linearization table

Listed below is an example GWBASIC program that calculates the linearization table, nv_flow1_volts (VOLTS) and nv_flow1_fpm (VEL) from the measured flow sensor calibration points found in nv_cal, the K factor, and duct diameter.

```
REM FILE LINEAR.BAS    7/24/93

REM Data file of inches of H2O to use in calculation
DATA 0, 0.0125, 0.025, 0.05, 0.1, 0.2, 0.4, 0.8, 1.6, 2.0
FOR I = 0 TO 9
READ INCH(I)
NEXT I

REM IDENTIFY THE PROGRAM
10 CLS
PRINT "VAV BOX LINEARIZATION TABLE CALCULATOR"

REM SELECT A FILE TO PUT THE OUTPUT IN
80 INPUT "DISPLAY OUTPUT ON SCREEN (s) OR SAVE IT IN A FILE (f)? ", C$
IF C$ = "S" OR C$ = "s" THEN OPEN "SCRN:" FOR OUTPUT AS #1: GOTO 100
IF C$ = "F" OR C$ = "f" THEN 90
GOTO 80
90 INPUT "Enter File Name: ", F$
F$ = "C:\vav\bas\" + F$
OPEN F$ FOR OUTPUT AS #1
100

REM ENTER THE CALBRATION POINTS
X0 = 0
INPUT "Enter zero flow voltage: ", Y0
INPUT "Enter center scale voltage and pressure (inches H20): ", Y1, X1
INPUT "Enter full scale voltage and pressure (inches H20):   ", Y2, X2

REM calculate the calibration curve coefficents
R0 = Y0 / ((X0 - X1) * (X0 - X2))
R1 = Y1 / ((X1 - X0) * (X1 - X2))
R2 = Y2 / ((X2 - X0) * (X2 - X1))
C0 = R0 * X1 * X2 + R1 * X0 * X2 + R2 * X0 * X1
C1 = -R0 * (X1 + X2) - R1 * (X0 + X2) - R2 * (X0 + X1)
C2 = R0 + R1 + R2

REM ENTER THE K FACTOR AND DUCT SIZE
INPUT "Enter the duct size (dia in inches) and K factor: ", d, K
AREA = 3.14159 * d ^ 2 / 576

REM PRINT INTERSTING INFORMATION
PRINT #1,
PRINT #1,
PRINT #1, "Sensor calibration points"
PRINT #1, "        VOLTS        INCHES"
PRINT #1, USING " ######.###"; Y0; X0
PRINT #1, USING " ######.###"; Y1; X1
PRINT #1, USING " ######.###"; Y2; X2
PRINT #1, "DuctDia(inches) = "; d; "  K factor = "; K; "  AREA = "; AREA; ""
PRINT #1, "R0,R1,R2,C0,C1,C2 = ";
PRINT #1, USING " ####.##"; R0; R1; R2; C0; C1; C2

REM CALCULATE THE PICKUP CURVE AND LINEARIZATION CURVE
```

```
FOR I = 0 TO 9
X = INCH(I)
VEL(I) = K * SQR(X) / AREA
VOLTS(I) = C0 + C1 * X + C2 * X ^ 2
CFM(I) = VEL(I) * AREA
NEXT I

REM PRINT THE LINEARIZATION CURVE AND MISC OTHER INFORMATIOIN
PRINT
PRINT #1, " THE LINEARIZATION CURVE (VOLTS VS VEL) IS:"
PRINT #1, "        VOLTS    VEL(FPM)   InH20(ref)    CFM(ref)"
FOR I = 0 TO 9
PRINT #1, USING " ######.###"; VOLTS(I); VEL(I); INCH(I); CFM(I)
NEXT I REM DO IT AGAIN
CLOSE #1
INPUT "RUN ANOTHER ONE(y or n)? ", C$
IF C$ = "Y" OR C$ = "y" THEN 10
```

Typical results of calculations made by this program are listed below:

```
Sensor calibration points
        VOLTS      INCHES
        0.500      0.000
        2.600      1.000
        4.500      2.000
DuctDia(inches) =  10   K factor = 1308   AREA =  .5454149
R0,R1,R2,C0,C1,C2 =   0.25    -2.60    2.25    0.50    2.20    -0.10
  THE LINEARIZATION CURVE (VOLTS VS VEL) IS:
        VOLTS    VEL(FPM)   InH20(ref)    CFM(ref)
        0.500      0.000      0.000       0.000
        0.527    268.124      0.013     146.239
        0.555    379.185      0.025     206.813
        0.610    536.248      0.050     292.478
        0.719    758.369      0.100     413.626
        0.936   1072.496      0.200     584.955
        1.364   1516.739      0.400     827.252
        2.196   2144.992      0.800    1169.911
        3.764   3033.477      1.600    1654.504
        4.500   3391.531      2.000    1849.791
```

```c
// ================================================================
// ******************* indexs to raw_data in SENSOR
#define FLOW1_INDEX        0
#define TEMP_INDEX         1
#define SET_PT_INDEX       2
#define R_HIGH_CAL_INDEX   3
#define RV_LOW_CAL_INDEX   4
#define V_HIGH_CAL_INDEX   5
#define CONFIG_R_INDEX     6
#define SPARE_INDEX        7

// ******************* hardware configurations in SENSOR
#define INITIAL_HARD_CONFIG      127
#define HARD_CONFIG_NOT_OK_ONCE  126
define HARD_CONFIG_OK_ONCE      125 define HARDWARE_CONFIG_1    1
define HARDWARE_CONFIG_2    2
#define HARDWARE_CONFIG_3    3
#define HARDWARE_CONFIG_4    4
#define HARDWARE_CONFIG_5    5
#define HARDWARE_CONFIG_6    6
#define HARDWARE_CONFIG_7    7
#define HARDWARE_CONFIG_8    8
#define HARDWARE_CONFIG_9    9
#define HARDWARE_CONFIG_10  10

//***** typedef and union for internal variable (matches hardware bit order)
// and network variable copy of digital input bits, internal
// variables of analog to digital convertor, sensor linearization, and
// resulting sensor readings typedef struct
{
    unsigned occ_unocc_sen  :1;  // occupancy sensor  ( 1 = occupancy )
    unsigned window_open    :1;  // 1 = window open
    unsigned fan_status     :1;  // 1 = fan on
    unsigned un01           :1;  // unused
    unsigned io_test        :1;  // 1 = test mode
    unsigned un03           :3;  // unused
} DIGITAL_IN;

typedef struct
{
    DIGITAL_IN ub_digital_in;
    unsigned override       :1;  // remote bypass switch, IO_1 (0 = sw.
pressed)
    unsigned                :7;

unsigned long raw_data[ 8 ];  // a/d raw output - use TEMP_INDEX,
                                  // SET_PT_INDEX, FLOW1_INDEX,
                                  // SPARE_INDEX, R_HIGH_CAL_INDEX,
                                  // RV_LOW_CAL_INDEX, V_HIGH_CAL_INDEX,
                                  // and CONFIG_R_INDEX to select the channel TEMP si_space_temp_s7;          // measured space temperature - degrees F
    TEMP si_remote_set_point_s7;    // measured remote set point - degrees F
    signed long si_flow1_volts_s12; // measured flow - volts
    signed long si_flow1_fpma_s3;   // uncorrected measured flow - fpm
    signed long si_flow1_fpm_s3;    // final corrected measured flow - fpm
    unsigned short ub_hard_config_s0; // hardware configuration number
} SENSOR;
```

```c
typedef struct
    {
    unsigned short ub_flow_gain;            // hardware cal. of flow sensor
    unsigned short ub_flow_offset;          // hardware cal. of flow sensor
    signed long si_high_volt_cal_s12;       // volts
    signed long si_flow_sen_volts_s12[ 3 ]; // volts
                                            //   INDEX 0 = volts at zero inches
                                            //   INDEX 1 = volts at mid scale
                                            //   INDEX 2 = volts at full scale
    signed long si_flow_sen_in_s12[ 2 ];    // in of water
                                            //   INDEX 0 = inches at mid scale
                                            //   INDEX 1 = inches at full scale
    } CAL;

define NO_FLOW_LIN_ENTRIES   10 typedef struct
    {
    signed long si_s12[ NO_FLOW_LIN_ENTRIES ];
            // volts (at bottom of range for this cell)
    } FLOW_LIN_VOLTS;

// the network variable nv_flow_lin_volts fields listed below may be changed by
// the nv_mapped using the field indexes below
#define FLOW_LIN_VOLTS_0_FIELD      0
#define FLOW_LIN_VOLTS_1_FIELD      1
#define FLOW_LIN_VOLTS_2_FIELD      2
#define FLOW_LIN_VOLTS_3_FIELD      3
#define FLOW_LIN_VOLTS_4_FIELD      4
#define FLOW_LIN_VOLTS_5_FIELD      5
#define FLOW_LIN_VOLTS_6_FIELD      6
#define FLOW_LIN_VOLTS_7_FIELD      7
#define FLOW_LIN_VOLTS_8_FIELD      8
define FLOW_LIN_VOLTS_9_FIELD      9 typedef struct
    {
    signed long si_s3[ NO_FLOW_LIN_ENTRIES ];
            // feet per minute (at bottom of range for this cell)
    } FLOW_LIN_FPM;

// the network variable nv_flow_lin_fpm fields listed below may be changed by
// the nv_mapped using the field indexes below
#define FLOW_LIN_FPM_0_FIELD      0
#define FLOW_LIN_FPM_1_FIELD      1
#define FLOW_LIN_FPM_2_FIELD      2
#define FLOW_LIN_FPM_3_FIELD      3
#define FLOW_LIN_FPM_4_FIELD      4
#define FLOW_LIN_FPM_5_FIELD      5
#define FLOW_LIN_FPM_6_FIELD      6
#define FLOW_LIN_FPM_7_FIELD      7
#define FLOW_LIN_FPM_8_FIELD      8
define FLOW_LIN_FPM_9_FIELD      9 typedef struct
    {
    signed long si_apparent_zero_s3;    // feet per minute (velocity)
    signed long si_actual_min_s3;       // feet per minute (velocity)
    signed long si_apparent_min_s3;     // feet per minute (velocity)
    signed long si_actual_max_s3;       // feet per minute (velocity)
```

```
    signed long si_apparent_max_s3;          // feet per minute (velocity)
    } FLOW_CAL;

// ****************** normally polled by CARE or factory test
network input eeprom CAL nv_cal =
    {
    127,            // ub_flow_gain
    0,              // ub_flow_offset
    11162,          // si_high_volt_cal_s12  =  2.725 volts
    2048,           // si_flow_sen_volts_s12[ 0 ] - volts at zero inches = 0.5
    10650,          // si_flow_sen_volts_s12[ 1 ] - volts at mid scale  =  2.6
    18432,          // si_flow_sen_volts_s12[ 2 ] - volts at full scale =  4.5
    4096,           // si_flow_sen_in_s12[ 0 ] - inches at mid scale = 1.00
    8192            // si_flow_sen_in_s12[ 1 ] - inches at mid scale = 2.00
    };

network input eeprom FLOW_LIN_VOLTS nv_flow1_volts =
    {
    2048,    // si_s12[ 0 ] =  0.500 volts
    2159,    // si_s12[ 1 ] =  0.527
    2273,    // si_s12[ 2 ] =  0.555
    2499,    // si_s12[ 3 ] =  0.610
    2945,    // si_s12[ 4 ] =  0.719
    3846,    // si_s12[ 5 ] =  0.939
    5587,    // si_s12[ 6 ] =  1.364
    8995,    // si_s12[ 7 ] =  2.196
    15417,   // si_s12[ 8 ] =  3.764
    18432    // si_s12[ 9 ] =  4.500
    };

network input eeprom FLOW_LIN_FPM nv_flow1_fpm =
    {
    0,       //    si_s3[ 0 ] =     0 fpm
    2144,    //    si_s3[ 1 ] =   268
    3032,    //    si_s3[ 2 ] =   379
    4288,    //    si_s3[ 3 ] =   536
    6064,    //    si_s3[ 4 ] =   758
    8576,    //    si_s3[ 5 ] =  1072
    12136,   //    si_s3[ 6 ] =  1517
    17152,   //    si_s3[ 7 ] =  2144
    24264,   //    si_s3[ 8 ] =  3033
    27128    //    si_s3[ 9 ] =  3391
    };

network input eeprom FLOW_CAL nv_flow1_cal =
    {
    0,       // si_apparent_zero_s3 =    0 feet per minute (velocity)
    1200,    // si_actual_min_s3    =  150 fpm
    1200,    // si_apparent_min_s3  =  150 fpm
    32000,   // si_actual_max_s3    = 4000 fpm
    32000    // si_apparent_max_s3  = 4000 fpm
    };
```

```c
/*********************************************************************
Function Name:  Get_Flow
*********************************************************************/
void Get_Flow( void )
   {
   // local variables
   unsigned short i;
   unsigned long divisor;

// Flow a/d calibration correction, and conversion to voltage
   nv_sensor.si_flow1_volts_s12 = nv_cal.si_high_volt_cal_s12  + muldivs( FLOW_SCALE,
           nv_sensor.raw_data[ V_HIGH_CAL_INDEX ]
           - nv_sensor.raw_data[ FLOW1_INDEX ],
           (nv_config.fifty_sixty_Hz ? FLOW_SCALE_FIFTY : FLOW_SCALE_SIXTY)   );

// Flow sensor linearization (using linear interpolation between points in
   // nv_flow1_lin table, and conversion to engineering units
   i = 1;

while( ( nv_flow1_volts.si_s12[ i ] < nv_sensor.si_flow1_volts_s12 ) &&
          (  i < ( NO_FLOW_LIN_ENTRIES - 1 )                           )   )
     {
     i++;
     }
   --i;

divisor = nv_flow1_volts.si_s12[ i+1 ] - nv_flow1_volts.si_s12[ i ];

nv_sensor.si_flow1_fpma_s3 =
       nv_flow1_fpm.si_s3[ i ] +
       muldivs(
           (nv_sensor.si_flow1_volts_s12 - nv_flow1_volts.si_s12[ i ]) ,
           nv_flow1_fpm.si_s3[ i+1 ] - nv_flow1_fpm.si_s3[ i ],
           (divisor ? divisor : 1)                               );

// limit flow value to upper and lower limit
   nv_sensor.si_flow1_fpma_s3 =
               min( nv_sensor.si_flow1_fpma_s3, FLOW_UPPER_LIMIT );
   nv_sensor.si_flow1_fpma_s3 =
               max( nv_sensor.si_flow1_fpma_s3, FLOW_LOWER_LIMIT );

//final flow corections and linearization using nv_flow1_cal
   if( nv_sensor.si_flow1_fpma_s3 < nv_flow1_cal.si_apparent_min_s3 )
      {
      divisor = nv_flow1_cal.si_apparent_min_s3 - nv_flow1_cal.si_apparent_zero_s3;

nv_sensor.si_flow1_fpm_s3 =
          muldivs( nv_sensor.si_flow1_fpma_s3 - nv_flow1_cal.si_apparent_zero_s3,
              nv_flow1_cal.si_actual_min_s3,
              (divisor ? divisor : 1)                                    );
      }
   else
      {
      divisor = nv_flow1_cal.si_apparent_max_s3 - nv_flow1_cal.si_apparent_min_s3;

nv_sensor.si_flow1_fpm_s3 =
          nv_flow1_cal.si_actual_min_s3 +
```

```
        muldivs( nv_sensor.si_flow1_fpma_s3 - nv_flow1_cal.si_apparent_min_s3,
                nv_flow1_cal.si_actual_max_s3 - nv_flow1_cal.si_actual_min_s3,
                (divisor ? divisor : 1)                                        );
    )

// if the flow sensor has failed, use the failed input state
    if( Test_Error( FLOW1_ERROR ) )
       nv_sensor.si_flow1_fpm_s3 = 0;

// calculate flow (cfm) from duct_area and flow (fpm)
    status.si_box_flow_cfm_s0 =
        muldivs( -nv_config.si_duct_area_s12, nv_sensor.si_flow1_fpm_s3, -32768
);

return;
    }
```

We claim:

1. The method for providing calibrated flow sensor units for connection to variable air volume measurement and control apparatus, comprising:
   a. connecting a sensor unit to produce measurements of air flow or pressure as a differential voltage output signal,
   b. measuring three pressure values with the sensor unit and applying corrections to these measurements,
   c. entering a pickup relationship between flow and pressure drop for the sensor unit into storage,
   d. using the pickup relationship expressed as a series of point values, and the three pressure values, calculating points on a linearization curve as a series of point values,
   e. using the unit with gain and offset preset, measure the sensor unit's signal output responsive to air flow at the unit's intended installation site at at least three additional conditions; no flow, minimal flow, and full flow or maximum flow,
   f. adjusting these air flow responsive values by employing duct area values of a duct in which the sensor unit is deployed, and adjust the linearization curve to these adjusted air flow responsive values.

2. The method set forth in claim 1 and further comprising the step:
   testing the sensor unit at at least two additional pressures and, based on the level of the output signal, determining the offset and gain needed to correct offset and gain errors of the sensor output and then correcting the sensor unit for said offset and gain errors.

3. The method set forth in claim 1 and further comprising the step:
   testing the sensor unit at at least two additional pressures and, based on the level of the output signal, calculating the offset and gain needed by an amplifier to correct offset and gain of the sensor output and storing the offset and gain corrections in an associated memory.

4. A system for employing air flow or pressure sensors with accurate calibration to measure volume flow for accurate control of a ventilation system having:
   means for sensing volume flow corrected for gain and offset variability and for use in a ventilation system ductwork so as to produce a representation of the flow through said ductwork,
   memory means to hold a series of point values for a linearization curve associated with said sensor,
   a computer program for generating a set of linearization curvepoint values from a pickup relationship between the air flow and pressure vis-à-vis said sensor,
   processing means for combining the computer generated point value set with a set of sensor unit signal values measured by the sensor unit after installation at a site in said ductwork, to produce accurate output signal values representative of the actual flow past the sensor unit.

5. A system for employing air flow or pressure sensors with accurate calibration to measure volume flow for accurate control of a ventilation system having:
   means for sensing volume flow calibrated to correct for gain and offset variability and for use in a ventilation system ductwork so as to produce a representation of the air flow through said ductwork,
   memory means to hold a series of point values for a linearization curve associated with said sensor,
   a computer program for generating a set of linearization curvepoint values from a pickup relationship between the air flow and pressure vis-à-vis said sensor,
   processing means for combining the computer generated point value set with a set of sensor unit signal values measured by the sensor unit after installation at a site in said ductwork, to produce accurate output signal values representative of the actual flow past the sensor unit.

* * * * *